United States Patent [19]
Lowrey et al.

[11] 3,846,457
[45] Nov. 5, 1974

[54] DEEP FAT FRYING WITH EDTA ESTERS TO REDUCE DARKENING

[75] Inventors: Erlend R. Lowrey, Greenhills; Vernon E. Weis, Cincinnati, both of Ohio

[73] Assignee: The Procter & Gamble Company, Cincinnati, Ohio

[22] Filed: June 28, 1971

[21] Appl. No.: 157,677

[52] U.S. Cl. .............................................. 260/398.5
[51] Int. Cl. ................................................. C11b 5/00
[58] Field of Search ..................... 260/398.5; 99/163

[56] References Cited
UNITED STATES PATENTS

| | | | |
|---|---|---|---|
| 2,714,113 | 7/1955 | Kuhrt | 260/410.7 |
| 3,390,098 | 6/1968 | Van Ness | 260/398.5 |
| 3,497,535 | 2/1970 | Lennon | 260/398.5 |

*Primary Examiner*—Elbert L. Roberts

[57] ABSTRACT

Alkyl di-, tri-, and tetra-esters of ethylene-diamine-tetraacetic acid (EDTA) are added to frying fats and oils at levels of 1 to 1,000 parts per million to retard darkening and foaming over long periods of use. The preferred range of addition is 10 to 200 parts per million and the preferred ester is the dioctadecyl ester of ethylene-diamine-tetraacetic acid (EDTA).

8 Claims, No Drawings

DEEP FAT FRYING WITH EDTA ESTERS TO REDUCE DARKENING

BACKGROUND OF THE INVENTION

The field of this invention is frying fat and oil compositions. The invention relates especially to frying fats and oils suitable for frying use in restaurants, especially for frying chicken, fish, onion rings, and potatoes.

During continued frying use, the amount of frying fat or oil is depleted as some of it is absorbed by the food being fried and other portions are vaporized during frying. This depletion is cured by the addition, from time to time, of new frying fat or oil.

During the frying life of the fat or oil it is common to filter it by conventional filtering methods. This filtering is carried out to remove from the frying fat or oil residual fried material and some chemical substances formed by deterioration of the fat or oil during frying. The material removed by filtration is often dark colored. This filtration is ordinarily carried out at regular intervals, for example, 24-hour intervals.

Despite the fact that during the frying life of a frying fat or oil composition, previously unused fat or oil is continually added, and despite the fact that the frying fat or oil during its frying life is subjected to filtration at regular intervals to remove foreign materials, the appearance of the frying fat or oil changes during its frying life from a pale amber-colored clear appearance when it is first used to a dark-brown opaque appearance after it has been subjected to a substantial amount of use; this color change is especially evident when fish or scallops are fried in the fat or oil. When this dark-brown opaque appearance is reached, the frying fat or oil is generally discarded.

Frying fats and oils have a tendency to foam upon prolonged use. The foaming increases until the fat or oil becomes unusable. Addition of silicones will reduce the foaming tendency, but with certain foods and under certain conditions silicones are not effective enough to stop foaming.

Thus, darkening and foaming are major reasons for discarding frying fats and oils upon prolonged use. Therefore, retardation of darkening and foaming would increase fry life and represent a significant product improvement.

It is therefore an object of this invention to provide a frying fat or oil composition having increased resistance to darkening so that darkening in the fat or oil as a result of prolonged use is retarded.

A further object of this invention is to provide a frying fat or oil composition having increased resistance to foaming so that foaming in the fat or oil as a result of prolonged use is retarded.

Yet another object of this invention is to significantly increase fry life (by about 10–50%).

These and other objects will become apparent from the following description.

U.S. Pat. No. 3,497,535, "Stabilization of Fats and Oils With Esters of EDTA and Related Compounds," William J. Lennon, shows the use of ethylene-diamine-tetraacetic acid esters in combination with antioxidants such as butylated hydroxytoluene (BHT) and butylated hydroxyanisole (BHA) to prevent the development of rancidity in fats and oils upon storage. However, this patent does not disclose the use of di-, tri-, and tetra-esters of ethylene-diamine-tetraacetic acid, without added antioxidants such as BHT and BHA, to retard darkening and foaming in frying fats and oils. U.S. Pats. Nos. 2,610,973, "Stabilization of Glyceride Oils" by Evans, Schwab, and Cowan; 2,714,113, "Method of Making a Partial Ester Composition of Improved Stability," and 2,732,386, "Stabilized Unsaturated Compositions and Stabilizer Therefor" by Kuhrt; and 2,983,615, "Flavor Stabilized Salted Margarine and Process of Producing the Same," and 3,243,302, "High Fat Food Products and Method of Preparing Same," by Melnick, show the use of ethylene-diamine-tetraacetic acid and materials such as phytic acid and citric acid, to stabilize fats and oils against rancidity. However, these patents do not disclose the use of ethylene-diamine-tetraacetic acid esters to retard darkening and foaming in frying fats and oils.

SUMMARY OF THE INVENTION

Briefly stated, this invention relates to a process by which frying fats and oils that are resistant to darkening and foaming are produced. The process of this invention involves the addition of 1 to 1,000 parts per million by weight of alkyl di-, tri-, and tetra-esters of ethylene-diamine-tetraacetic acid, or mixtures thereof, to a frying fat or oil. These esters are of the formula

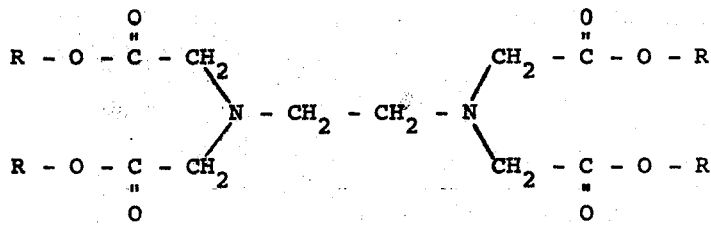

wherein R is hydrogen or an alkyl radical containing from 6 to 24 carbon atoms, but wherein at least two R groups must be such an alkyl radical. The preferred amount of such ester is from 10 to 200 parts per million by weight and the preferred ester is the dioctadecyl ester. Frying fats or oils made by this process exhibit longer fry life due to reduced darkening and foaming tendencies.

DETAILED DESCRIPTION OF THE INVENTION

Thus, according to the process of the present invention there is provided darkening and foaming resistant frying fat or oil compositions. These compositions comprise a minor proportion of anti-darkening and anti-foaming additives and a major proportion of fatty glyceride. The additives are the above described di-, tri-, and tetra-esters, or mixtures thereof, of ethylene-diamine-tetraacetic acid, hereinafter referred to as EDTA. The esters are dissolved in the fatty glyceride. In order to obtain this solution, the additives can be directly mixed with a processed fat or oil.

From about 1 to about 1,000 parts per million of the EDTA esters are added to frying fats and oils in accordance with this invention. If less than 1 part per million is added, there would be no appreciable effect upon the darkening and foaming tendencies of the fat or oil. The addition of more than 1,000 parts per million would not bring about an increase in effectiveness and therefore would be uneconomical. The best balance between effectiveness and economy is found within the preferred range of 10 to 200 parts per million. The preferred ester of EDTA for use in this invention is the dioctadecyl ester. The addition of the EDTA ester additive will retard the rates of darkening and foaming so as to increase the fry life of frying fats and oils by about 10–50 percent.

The darkening of fats and oils during frying is related to chemical reactions among components of the fat or oil, oxygen, and the food fried therein. While not intending to limit the invention in any way, it is believed that darkening occurs as a result of chemical reactions between the fat or oil and food components which are catalyzed by metal ions. These metal ions may be introduced into the fat by the cooking equipment or by the food being fried. It is theorized that the alkyl esters of EDTA described above act as chelating agents in the fats and oils, tying up the metal ions which act as catalysts, and thereby slow down the reactions which cause darkening.

The causes of foaming are not well understood, but the degree of foaming is known to be related to the amount of polymerized fat in the oil. In turn, the amount of polymerized fat appears to be related to the same or similar chemical reactions which seem to cause darkening. Thus, it is theorized that the chelation of metal ions by the alkyl esters of EDTA described above is also the reason for the reduction in foaming which occurs when such esters are added to frying fats and oils.

The sodium salt of EDTA is known to be a chelating agent. However, the sodium salt of EDTA is ineffective in reducing either darkening or foaming in frying fats and oils. It is theorized that its ineffectiveness is a result of its low solubility in fats and oils, and that the above-described alkyl esters of EDTA are effective because they are relatively soluble in fats and oils. The solubility of the esters appears to be the most important factor in the ester's ability to effectively retard darkening and foaming. Therefore, the chain length of the esters groups is only important as it affects solubility. When the chain length of the ester group is from 6 to 24 carbon atoms, the solubility is sufficient.

The fatty glyceride in which the additive of this invention is employed can be plastic, liquid, or a suspension of solid glyceride in liquid glyceride and can be of vegetable, animal, or marine origin. The glyceride components can be saturated or unsaturated. They are preferably mostly triglyceride. They can be, or can be derived from, naturally occurring fats and oils as well as synthetically prepared glycerides or fractions or mixtures thereof. In general, these glycerides contain fatty acid groups having from 12 to 24 carbon atoms such as fatty acid groups of lauric, myristic, palmitic, stearic, oleic, linoleic, linolenic, arachidic, behenic, and erucic acids. For example, the glycerides can be derived from cottonseed, soybean, peanut, safflower, sesame, sunflower, and rapeseed oils. Fish oils such as herring, menhaden, and whale oil also can be used. Lard and tallow are typical examples of plastic animal fats which can be used as the fatty glyceride in the practice of this invention.

The fatty glyceride can be processed or crystallized in various ways. For example, one method is to melt the desired glyceride composition and then supercool rapidly from the molten state to a temperature below the solidifying point of the fat in an apparatus such as a "Votator" freezer, described in Vogt, U.S. Pat. No. Re. 21,406, granted Mar. 19, 1940. Another method of processing is to form a uniform suspension of high melting solids in liquid according to the teachings of Holman and Quimby, U.S. Pat. No. 2,521,219, and Mitchell, U.S. Pat. No. 2,521,241, both granted Sept. 5, 1950. Methods for forming these suspensions are also found in Holman and Sanders, U.S. Pat. No. 2,815,285, and Andre and Going, U.S. Pat. No. 2,815,286, both granted Dec. 3, 1957. Other suitable treatments consist of interesterifying mixtures of fatty triglycerides to give a random distribution of the triglycerides and low temperature, directed interesterification such as taught by Eckey, U.S. Pats. Nos. 2,442,531 to 2,442,539, inclusive, granted June 1, 1948, and Holman and Going, U.S. Pats. Nos. 2,875,066–7, granted Feb. 24, 1959.

The preferred fatty glyceride for use herein is a suspension of high melting solids in liquid. The high melting component amounts to 1.0 to 20 percent by weight of the total composition. It is highly preferred that both the high melting solids and liquid be vegetable triglyceride. This preferred fatty glyceride suspension can be prepared by the processes for preparing glyceride suspensions described above.

It will be understood that the use of comparatively small proportions of non-triglyceride additives in addition to the anti-darkening and anti-foaming additives of this invention is not excluded from the present invention. Thus, for example, the use of emulsifiers, e.g., mono- and diglycerides, partial fatty acid esters of dihydric alcohols, sugar alcohols, phosphoric acid, citric acid, or methyl silicone may be desirable. However, these further additives are present in proportions of not more than 25 percent by weight of the composition, the proportion being generally about 10 percent or less. Various minor additives can also be used in the frying fat compositions of this invention provided that they are not aesthetically undesirable and do not detract from the improved properties of the frying fat composition. Small amounts of flavoring, coloring, and crystal inhibitors, such as oxystearin, can also be added if desired.

As previously stated, the frying fat and oil compositions herein are suitable for repeated long-term frying use, especially in restaurants for deep-fat frying of chicken, fish, onion rings, and potatoes. The anti-darkening and anti-foaming additives which are present in the frying fat and oil compositions cause these compositions to have increased resistance to darkening and foaming so that darkening and foaming in the fat or oil as a result of repeated usage is retarded and fry life is increased by about 10–50 percent.

The following examples further illustrate the frying fat and oil compositions of this invention, their preparation, their long term use for frying, and their significant advantage from a darkening and foaming standpoint compared to a control composition. The examples are intended only to illustrate the invention and not to limit it in any way.

EXAMPLE I

Fifty parts per million of the dioctadecyl ester of ethylene-diamine-tetraacetic acid was added to deodorized soybean oil with an iodine value of 107 which contained small amounts of phosphoric acid and Dow Corning 200 Fluid dimethylpolysiloxane which had a viscosity of 500 centipoises at 25°C. The EDTA ester-containing oil was fry-tested, and its color was compared with that of a fry-tested deodorized control oil which contained no EDTA esters, but did contain the same amounts of phosphoric acid, Dow Corning 200 Fluid dimethylpolysiloxane which had a viscosity of 500 centipoises at 25°C as the EDTA ester-containing oil contained, and a small amount of Cab-O-Sil made by Cabot Corp. of Boston, Mass., which is a fumed silica anti-coloring agent. Ten 200-gram lots of frozen breaded sea scallops were fried in each of the oils over a 3-day period. The oil temperature was carefully maintained at 350°F. The Lovibond Red color of the oils was determined after every second fry by using Red Lovibond color glasses as shown in *Bailey's Industrial Oil and Fat Products*, edited by Daniel Swern, published by Interscience Publishers, 3d edition, 1964, page 769. The following chart shows the results of these tests.

Lovibond Red Color of Frying Oil - Chart No. 1

| Number of Frys | With the Diester | Without the Diester |
|---|---|---|
| 0 | 0.8 | 0.8 |
| 2 | 2.0 | 2.5 |
| 4 | 3.6 | 6.0 |
| 6 | 7.1 | 14.3 |
| 8 | 12.3 | 23.4 |
| 10 | 19.6 | 38 |

After each of the frys, there is considerably less color (represented by a lower Lovibond Red color number) in the oil containing the EDTA ester additive than in the oil which did not contain the EDTA ester additive.

EXAMPLE II

The procedure followed in Example I is repeated using a deodorized control oil which consists of 96 percent soybean oil with an iodine value of 107, 4 percent of soybean oil with an iodine value of 8, small amounts of phosphoric acid, and Dow Corning 200 Fluid dimethylpolysiloxane which has a viscosity of 500 centipoises at 25°C. One part of the tetraoctadecyl ester of ethylene-diamine-tetraacetic acid is dissolved in 100 parts of chloroform. This solution is then mixed with 1,500 milliliters of a deodorized test oil which comprises soybean oil with an iodine value of 107, and the same amount of phosphoric acid as the control oil contained. This mixture is then added to 7 pounds of the test oil and the chloroform is stripped off by heating the oil under a vacuum at 200°F for 5 minutes. The oils are then fry tested as in Example I and the results are shown below.

Lovibond Red Color of Frying Oil - Chart No. 2

| Number of Frys | With the Tetraester | Without the Tetraester |
|---|---|---|
| 2 | 2.0 | 2.9 |
| 4 | 3.1 | 4.6 |
| 6 | 7.1 | 9.9 |
| 8 | 10.0 | 13 |
| 10 | 15 | 19 |

The above chart shows that the oil containing the tetraester of EDTA has less color (represented by a lower Lovibond Red color number) than the oil which does not contain the tetraester.

EXAMPLE III

Fifty parts per million of the dioctadecyl ester of ethylene-diamine-tetraacetic acid were added to deodorized soybean oil with an iodine value of 107 which contained small amounts of phosphoric acid and Dow Corning 200 Fluid dimethylpolysiloxane which had a viscosity of 500 centipoises at 25°C. The EDTA ester-containing oil and the base oil without the EDTA ester were fry-tested to compare their tendencies to darken and foam.

Fourteen and one-half pounds of the oils were placed in large kettles at 360°F and a variety of foods were fried in the kettles in 1 pound lots. The foods were cooked in the following order: precooked, frozen, breaded chicken was fried for 4½ minutes; frozen, breaded scallops were fried for 3½ minutes; frozen, breaded onion rings were fried for 2 minutes; ¾-inch regular cut, frozen, pre-blanched french fries were fried for 3 minutes; pre-breaded frozen fish portions were fried for 3½ minutes; and frozen, breaded onion rings were again fried for 2 minutes. After the above frys, which took approximately 2½ hours, the kettles were maintained at 360°F for 4 hours and then shut off for 8 hours. Then the kettles were turned on again and were maintained at 360°F for 4½ hours. Then precooked, frozen, breaded chicken was fried for 4½ minutes; frozen, breaded scallops were fried for 3½ minutes; and frozen, breaded onion rings were fried for 2 minutes. This procedure took approximately an hour and a half. Then the kettles were shut off and the oil was analyzed to determine its level of darkening and foaming.

The color of the oil was determined by using Lovibond Red glasses as described in Example I. The amount of foaming was determined by measuring the height of the foam during the last onion fry of the above-described cycle.

The above procedure was repeated many times over a period of several weeks. After each cycle of approximately 14 hours at 360°F, the oil was filtered and enough fresh oil was added back to the kettle to bring the total amount of oil back to 14½ pounds. The tests were discontinued when either the color became too dark (above 400 Lovibond Red color) or the level of foam became too high (greater than 2 inches). The results are shown in the following chart.

Chart No. 3

Oil with 50 Parts Per Million of the EDTA Ester

| Frying Time (hours) | Lovibond Red Color | Foam Height (inches) |
|---|---|---|
| 0 | 0.6 | — |
| 8 | 7.4 | 0 |
| 22 | 18.3 | 0 |
| 36 | 34.2 | 0 |
| 50 | 89.0 | 0.2 |
| 64 | 111.0 | 0.0 |
| 78 | 127.0 | 0.2 |
| 92 | 162.0 | 0.2 |
| 106 | 198.0 | 0.75 |
| 120 | 230.0 | 1.5 |
| 134 | 314.0 | 0.2 |
| 148 | 292.0 | 0.75 |
| 162 | 316.0 | 1.0 |
| 176 | 400+ | 1.0 |

Chart No. 3—Continued

Oil with 50 Parts Per Million of the EDTA Ester

| Frying Time (hours) | Lovibond Red Color | Foam Height (inches) |
|---|---|---|
| 190 | — | 1.0 |
| 204 | — | 1.0 |
| 218 | — | 0.25 |

Chart No. 4

Oil Without EDTA Ester

| Frying Time (hours) | Lovibond Red Color | Foam Height (inches) |
|---|---|---|
| 0 | 0.6 | — |
| 8 | 10.2 | 0 |
| 22 | 21.5 | 0 |
| 36 | 74.0 | 0 |
| 50 | 107.0 | 0 |
| 64 | 145.0 | 0 |
| 78 | 158.0 | 0.2 |
| 92 | 206.0 | 0.2 |
| 106 | 254.0 | 0.75 |
| 120 | 311.0 | 1.0 |
| 134 | 400+ | 1.25 |
| 144 | 362.0 | 1.0 |
| 158 | 399.0 | 1.75 |
| 172 | 400+ | 1.50 |
| 186 | — | 1.88 |
| 200 | — | 2.25 |
| 214 | — | 2.2 |

A comparison of Charts Nos. 3 and 4 shows that the oil containing the EDTA ester exhibited less color and less foam than the oil without the EDTA ester.

EXAMPLE IV

The procedure of Example II is repeated using another deodorized oil having the same composition as the oil in Example III. Two samples, one containing 10 ppm of the dioctadecyl ester of EDTA, and the other containing 100 ppm of the dioctadecyl ester, were compared with a control sample. The results are shown in the charts below.

Chart No. 5

Oil Containing 100 Parts Per Million of the EDTA Ester

| Frying Time (hours) | Lovibond Red Color | Foam Height (inches) |
|---|---|---|
| 0 | 0.6 | — |
| 8 | — | 0.25 |
| 22 | 18.7 | 0.5 |
| 29 | 60 | 0.2 |
| 43 | 97 | 0.75 |
| 57 | 120 | 1.25 |
| 71 | 155 | 1.25 |
| 81 | 214 | 1.25 |
| 95 | 258 | 1.25 |
| 109 | 293 | 1.25 |
| 123 | 346 | 1.25 |
| 137 | 400+ | 1.5 |
| 151 | — | 1.25 |
| 165 | — | 1.5 |
| 179 | — | 1.25 |
| 193 | — | 1.25 |
| 207 | — | 1.5 |
| 221 | — | 1.25 |
| 235 | — | 1.5 |
| 249 | — | 1.5 |
| 263 | — | 1.5 |
| 277 | — | 1.25 |
| 291 | — | 1.5 |
| 297 | — | 1.5 |
| 311 | — | — |
| 325 | — | 1.25 |
| 339 | — | 1.25 |
| 353 | — | 1.25 |
| 367 | — | 1.25 |
| 381 | — | 1.5 |
| 395 | — | 1.25 |
| 409 | — | 1.0 |

Chart No. 6

Oil Containing 10 ppm of the EDTA Ester

| Frying Time (hours) | Lovibond Red Color | Foam Height (inches) |
|---|---|---|
| 0 | 0.7 | — |
| 8 | 3.7 | 0.5 |
| 22 | — | 1.0 |
| 36 | 53 | 0.5 |
| 46 | 69 | 0.75 |
| 60 | 86 | 1.0 |
| 74 | 121 | 1.0 |
| 88 | 157 | 1.0 |
| 102 | 202 | 1.25 |
| 116 | 400+ | 1.25 |
| 130 | 302 | 1.5 |
| 144 | 325 | 1.25 |
| 158 | — | 1.25 |
| 172 | 400+ | 1.5 |
| 186 | — | 1.25 |
| 200 | — | 1.5 |
| 214 | — | 1.5 |
| 228 | — | 1.25 |
| 242 | — | 1.5 |
| 256 | — | 1.5 |
| 262 | — | 1.5 |
| 276 | — | — |
| 290 | — | 1.0 |
| 304 | — | 1.0 |
| 318 | — | 1.25 |
| 332 | — | 1.25 |
| 346 | — | 1.25 |
| 360 | — | 1.5 |
| 374 | — | 1.25 |
| 388 | — | 1.25 |
| 402 | — | 1.5 |
| 416 | — | 1.25 |

Chart No. 7

Oil Without the EDTA Ester

| Frying Time (hours) | Lovibond Red Color | Foam Height (inches) |
|---|---|---|
| 0 | 5 | — |
| 8 | 10 | 0.2 |
| 22 | 19.8 | 0.2 |
| 29 | 81 | 0 |
| 43 | 93 | 0.25 |
| 57 | 119 | 0.5 |
| 71 | 174 | 0.2 |
| 85 | 247 | 0.2 |
| 99 | 293 | 0.5 |
| 103 | 392 | 0.5 |
| 117 | 400+ | 0.25 |
| 131 | — | 1.0 |
| 145 | — | 0.75 |
| 169 | — | 1.0 |
| 183 | — | 1.25 |
| 197 | — | 1.25 |
| 211 | — | 1.5 |
| 225 | — | 1.25 |
| 239 | — | 1.5 |
| 253 | — | 1.5 |
| 267 | — | 1.25 |
| 281 | — | 1.5 |
| 295 | — | 1.25 |
| 301 | — | 1.25 |
| 315 | — | — |

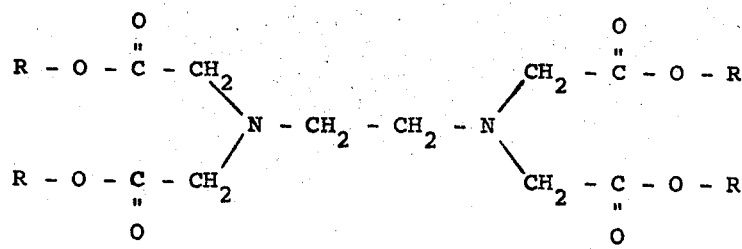

Chart No. 7—Continued

Oil Without the EDTA Ester

| Frying Time (hours) | Lovibond Red Color | Foam Height (inches) |
|---|---|---|
| 329 | — | 1.5 |
| 343 | — | 1.5 |
| 357 | — | 1.75 |
| 371 | — | 2.25 |
| 385 | — | 1.75 |
| 399 | — | 1.75 |
| 413 | — | 1.50 |

Comparison of the above data reveals that the frying oils containing the EDTA ester exhibit less color and less foam than the oil which did not contain the EDTA ester. It should be noted that the Lovibond Red color of the sample without the EDTA ester went over 400 substantially earlier than the color of the oils which did contain the EDTA ester.

EXAMPLE V

The procedures of Examples I and III are repeated using the di-, tri-, and tetra- $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{19}$, $C_{20}$, $C_{21}$, $C_{22}$, $C_{23}$, and $C_{24}$ alkyl esters of ethylene-diamine-tetraacidic acid. The results of color and foaming tests show that the addition of these esters reduces the darkening and foaming tendencies of the frying oil.

What is claimed is:

1. A process for reducing the rates of darkening and/or foaming of fats and oils during frying which consists essentially of adding to the fats or oils about 1 to about 1,000 parts per million by weight of alkyl esters of ethylene-diamine-tetraacetic acid of the formula wherein R is hydrogen or an alkyl radical containing from 6 to 24 carbon atoms and wherein at least two R groups are such an alkyl radical.

2. The process of claim 1 wherein the amount of such ester added is about 10 to about 200 parts per million by weight.

3. The process of claim 2 wherein the alkyl ester of ethylene-diamine-tetraacetic acid is dioctadecyl ester.

4. The process of claim 2 wherein the alkyl ester of ethylene-diamine-tetraacetic acid is tetraoctadecyl ester.

5. Frying fats and oils consisting essentially of fatty glyceride and from about 1 to about 1,000 parts per million by weight of alkyl esters of ethylene-diamine-tetraacetic acid of the formula

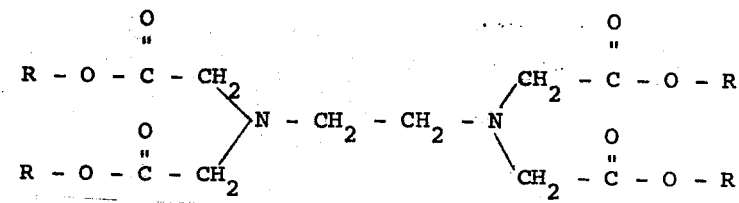

wherein R is hydrogen or an alkyl radical containing from 6 to 24 carbon atoms and wherein at least two R groups are such an alkyl radical.

6. The composition of claim 5 wherein the amount of alkyl ester of ethylene-diamine-tetraacetic acid which is present is about 10 to about 200 parts per million by weight.

7. The composition of claim 6 wherein the ester is the dioctadecyl ester of ethylene-diamine-tetraacetic acid.

8. The composition of claim 6 wherein the ester is the tetraoctadecyl ester of ethylene-diamine-tetraacetic acid.

* * * * *

PO-1050
(5/69)

UNITED STATES PATENT OFFICE
CERTIFICATE OF CORRECTION

Patent No. 3,846,457      Dated November 5, 1974

Inventor(s) Erlend R. Lowrey and Vernon E. Weis

It is certified that error appears in the above-identified patent and that said Letters Patent are hereby corrected as shown below:

Column 1, line 7    before "frying" insert -- repeated --

Column 3, line 65    "rapseed" should be -- rapeseed --

Column 7, line 36    "Example II" should be -- Example III --

Signed and sealed this 14th day of January 1975.

(SEAL)
Attest:

McCOY M. GIBSON JR.
Attesting Officer

C. MARSHALL DANN
Commissioner of Patents